United States Patent
Ayoub

(10) Patent No.: US 10,795,429 B2
(45) Date of Patent: Oct. 6, 2020

(54) METHOD AND SYSTEM FOR ASSET TRACKING

(71) Applicant: BlackBerry Limited, Waterloo (CA)

(72) Inventor: Sameh Ayoub, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 134 days.

(21) Appl. No.: 16/016,317

(22) Filed: Jun. 22, 2018

(65) Prior Publication Data

US 2019/0391634 A1 Dec. 26, 2019

(51) Int. Cl.
| | |
|---|---|
| *G06F 1/3296* | (2019.01) |
| *G06F 1/3206* | (2019.01) |
| *G06Q 50/28* | (2012.01) |
| *G06Q 10/08* | (2012.01) |
| *G01S 5/00* | (2006.01) |
| *H04W 4/029* | (2018.01) |

(52) U.S. Cl.
CPC .......... *G06F 1/3296* (2013.01); *G01S 5/0027* (2013.01); *G06F 1/3206* (2013.01); *G06Q 10/0833* (2013.01); *G06Q 50/28* (2013.01); *H04W 4/029* (2018.02)

(58) Field of Classification Search
CPC .......... H04W 4/35; H04W 4/40; H04W 4/42; H04W 4/44; H04W 4/029; H04W 4/046; G08G 1/20; G06Q 10/0833; G06F 1/3203; G06F 1/3206; G06F 1/3296; G01S 5/0027
See application file for complete search history.

(56) References Cited

U.S. PATENT DOCUMENTS

| | | | |
|---|---|---|---|
| 6,281,797 B1 * | 8/2001 | Forster .................. | G01S 5/0018 340/438 |
| 7,378,960 B1 | 5/2008 | Binding et al. | |
| 9,185,517 B2 | 11/2015 | Kuhl et al. | |
| 10,473,750 B2 * | 11/2019 | Hergesheimer ....... | G01S 5/0294 |
| 2008/0129490 A1 | 6/2008 | Linville et al. | |
| 2009/0204830 A1 * | 8/2009 | Frid ........................ | G06F 1/324 713/322 |
| 2010/0149028 A1 | 6/2010 | Mermet et al. | |
| 2010/0265061 A1 | 10/2010 | Harmon et al. | |
| 2010/0332877 A1 * | 12/2010 | Yarch .................... | G06F 1/3203 713/323 |
| 2011/0054979 A1 | 3/2011 | Cova et al. | |

(Continued)

FOREIGN PATENT DOCUMENTS

| | | | | |
|---|---|---|---|---|
| WO | WO-9812862 A1 * | 3/1998 | ............ | H04M 11/04 |
| WO | 2017222734 A1 | 12/2017 | | |

OTHER PUBLICATIONS

Notice of Allowance dated Mar. 11, 2019; U.S. Appl. No. 16/041,324, filed Jul. 20, 2018; 13 pages.

(Continued)

*Primary Examiner* — Glenn A. Auve
(74) *Attorney, Agent, or Firm* — Conley Rose, P.C.; J. Robert Brown, Jr.; Robert E. Kent

(57) ABSTRACT

Described herein is a method for asset tracking using an asset tracking device. The method comprises detecting a trigger to perform a co-location check; in response to the trigger, determining the asset tracking device is co-located with a carrier en route to a destination; determining a low power duration; and causing the asset tracking device to enter a low power mode for the low power duration.

14 Claims, 5 Drawing Sheets

(56) References Cited

U.S. PATENT DOCUMENTS

| | | | |
|---|---|---|---|
| 2011/0312286 A1* | 12/2011 | Lin | H04W 52/0254 |
| | | | 455/73 |
| 2014/0013136 A1* | 1/2014 | Dadu | G06F 1/3209 |
| | | | 713/323 |
| 2014/0184804 A1 | 7/2014 | Lee et al. | |
| 2015/0012148 A1 | 1/2015 | Bhageria, Jr. et al. | |
| 2016/0205500 A1 | 7/2016 | Lee et al. | |
| 2016/0232483 A1 | 8/2016 | London et al. | |
| 2016/0284185 A1 | 9/2016 | Maison et al. | |
| 2018/0039314 A1* | 2/2018 | Chennakeshu | G06F 1/3296 |
| 2018/0041944 A1* | 2/2018 | Korneluk | H04W 52/0225 |
| 2018/0041965 A1 | 2/2018 | Korneluk et al. | |
| 2018/0041982 A1* | 2/2018 | Mulaosmanovic | G01S 19/13 |

OTHER PUBLICATIONS

European Extended Search Report; Application No. 19179876.8; dated Nov. 19, 2019; 9 pages.
European Extended Search Report; Application No. 19187426.2; dated Sep. 23, 2019; 6 pages.
Kugler, Andrew, et al.; U.S. Appl. No. 16/041,324, filed Jul. 20, 2018; Title: Method and System for Asset Tracking; 40 pages.

* cited by examiner

METHOD AND SYSTEM FOR ASSET TRACKING

FIELD OF THE DISCLOSURE

The present disclosure relates to asset tracking, and in particular relates to increasing battery life of an asset tracking device.

BACKGROUND

Freight transport is the physical process of transporting commodities and merchandise goods and cargo. The term shipping originally referred to transport by sea, but in general use it has been extended to additionally encompass transport by land and air.

Asset tracking devices are attached to or form part of shipments in order to track the location of (as well as other operations relating to) those shipments. Asset tracking devices utilize a variety of technologies for location tracking including, for example, radio-frequency identification (RFID), the global positioning system (GPS), and radio signal triangulation. Some asset tracking devices do not include an internal power source and are considered passive. Passive asset tracking devices receive a radio signal and use energy from the signal to broadcast a weak response signal. Passive asset tracking devices are typically only useful for a range of several feet.

Some asset tracking devices include a power source to boost signal strength and transmission range and are considered active. Active asset tracking devices transmit their locations to a receiver over far greater distances than a passive asset tracking device, for example several miles. Active asset tracking devices gather location data using sensors or receivers and transmit the location data or a calculated location to a receiver interested in the location of the asset tracking device. Such asset tracking devices are often battery powered and may last a finite amount of time before the battery dies. It is desirable to improve asset tracking devices so that they can operate for longer before the battery dies.

SUMMARY

In an embodiment described herein, a method for asset tracking using an asset tracking device is provided. The method comprises detecting a trigger to perform a co-location check; in response to the trigger, determining the asset tracking device is co-located with a carrier en route to a destination; determining a low power duration; and causing the asset tracking device to enter a low power mode for the low power duration.

In another embodiment described herein, an asset tracking system is provided. The asset tracking system comprises a memory; and a processor coupled to the memory. The processor is configured to detect a trigger to perform a co-location check; in response to the trigger, determine an asset tracking device is co-located with a carrier en route to a destination; determine a low power duration; and cause the asset tracking device to enter a low power mode for the low power duration.

In another embodiment described herein, a method for asset tracking using an asset tracking device is provided. The method comprises transmitting a plurality of location updates to an asset tracking system; receiving a message from the asset tracking system, the message comprising a low power instruction and a low power duration; entering a low power mode in response to the low power instruction; and exiting the low power mode in response to either expiration of the low power duration or detection of an interrupt.

In another embodiment described herein, an asset tracking device is provided. The asset tracking device comprises a memory; and a processor coupled to the memory. The processor is configured to transmit a plurality of location updates to an asset tracking system; receive a message from the asset tracking system, the message comprising a low power instruction and a low power duration; enter a low power mode in response to the low power instruction; and exit the low power mode in response to either expiration of the low power duration or detection of an interrupt.

BRIEF DESCRIPTION OF THE DRAWINGS

The present disclosure will be better understood with reference to the drawings, in which.

DETAILED DESCRIPTION

Figure 1:
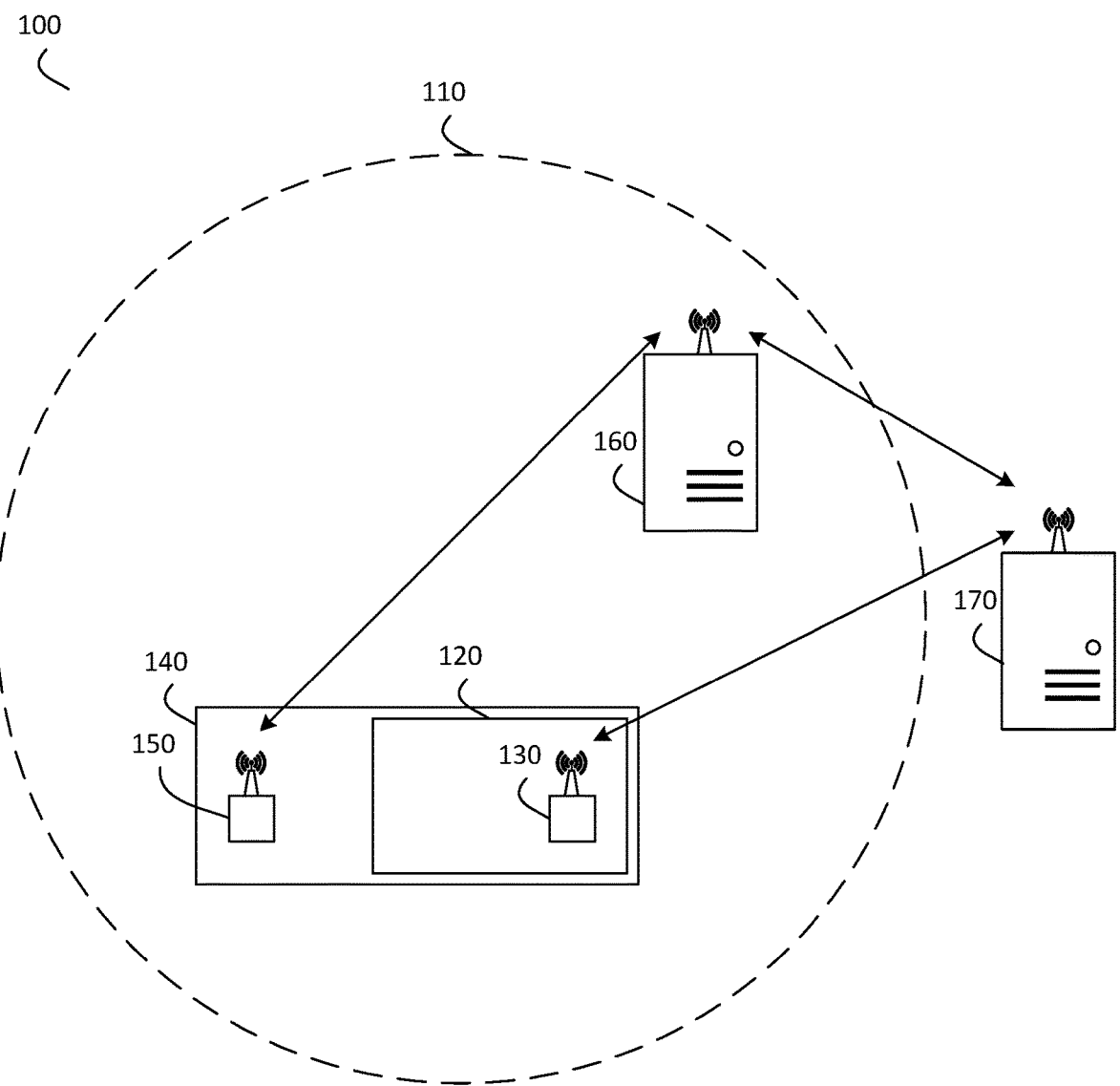
FIG. 1 is a diagram of an embodiment of a system for increasing battery life in an asset tracking device.

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein are systems and methods for increasing battery life of an asset tracking device which is attached to a vessel or container comprising goods or produce. The vessel or container whether empty or comprising goods is hereinafter referred to as an asset. The term asset encompasses a single item, for example a vehicle, as well as any container or vessel housing or supporting a plurality of items.

An asset tracking device may be any apparatus or computing device that is capable of providing data or information from sensors or receivers associated with the asset tracking device to a remote monitoring system. Sensors or receivers associated with the tracking device may either be physically part of the asset tracking device, or may be associated with the asset tracking device through short range wired or wireless communications.

As used herein, a shipper includes any entity that seeks transport for one or more items, and a carrier includes any entity that provides the transport sought by the shipper. A carrier may include, but is not limited to, a train, cargo ship, airplane, or other shipping method. Cargo is a type of asset and may include, but is not limited to, shipping containers, trailers, pallets, or goods shipped by a shipper. Other types of assets may be tracked using an asset tracking device and system described herein. The shipper asset tracking device may be attached to the cargo or to an asset carrying the cargo.

The shipper asset tracking device may occasionally provide a location update to a shipper asset tracking system. A triggering event may trigger the shipper asset tracking system to begin comparing location updates from the shipper asset tracking device with location updates provided by a carrier asset tracking device. The triggering event may include departure from a carrier station, for example, train station, truck depot, port, airport, etc.

The shipper asset tracking system or the asset tracking device may determine that the cargo is co-located with and moving with the carrier based on the location measurements from the shipper asset tracking device and the carrier asset tracking device. Co-located in this sense means that there is some connection between the location of the carrier and the location of the cargo. It encompasses when both the carrier and the asset tracking device are reporting the same location, and also encompasses when the carrier and the asset tracking device are reporting or following a similar path. In an example of a cargo travelling by train, the cargo may be a mile behind the engine but following a similar path. In a large cargo ship, the carrier and the asset tracking device may report locations that differ by several hundred meters, yet since they are co-located they follow a similar path.

The carrier asset tracking device may transmit location measurements to a carrier asset tracking system that may then provide location updates to the shipper asset tracking system. The shipper asset tracking system may rely on the carrier asset tracking system for location updates rather than location updates from the shipper asset tracking device. The shipper may determine the location of the carrier from publicly available information regarding the carrier's location. The asset tracking device may enter power saving mode and increase battery life when it is determined to be co-located with the carrier.

FIG. 1 is a diagram of an embodiment of a system 100 for cargo tracking. Geofence 110 may surround a carrier station, for example, train station, truck depot, port, airport, etc. Geofences may be used for fleet tracking and management. Geofencing is a technique for monitoring and providing an alert in response to the movement of an electronic device, such as a computing device within a vehicle or shipping container, into or out of a prescribed area around which a geofence is defined. A geofence is determined with reference to boundaries of a geographical area. Location data from the electronic device, for example, an asset tracking device, is compared with coordinate ranges of the geofence to determine whether the electronic device is inside or outside the geofence.

Shipping companies often maintain geofences around important places, including but not limited to storage yards, client sites, maintenance sites, rest areas, among others. When a vehicle or shipping container enters or exits a geofenced area, alerts can be provided and logs created.

Cargo 120 may be loaded onto a carrier 140 at the carrier station. The cargo 120 may have a shipper asset tracking device 130 attached. Shipper asset tracking device 130 may communicate with a shipper asset tracking system 170 for tracking the location of the cargo 120.

The carrier 140 may include a carrier asset tracking device 150. The carrier asset tracking device 150 may communicate with a carrier asset tracking system 160. The carrier asset tracking system 160 has been shown in FIG. 1. as being inside the geofence 110. However, this is not necessary and the carrier system can be located at a location remote from the carrier station and geofence 110.

In an embodiment, a shipper delivers cargo 120 to the carrier station surrounded by geofence 110 for shipment by carrier 140. The shipper asset tracking device 130 takes location measurements at periodic intervals, in real-time, or based on some other predetermined event. The shipper asset tracking device 130 transmits the location measurements or other location information to the shipper asset tracking system 170.

The carrier asset tracking system 160 monitors the location of carrier 140 using carrier asset tracking device 150. Carrier asset tracking device 150 may take location measurements at periodic intervals, in real-time, or based on some other predetermined event. The carrier asset tracking system 160 and shipper asset tracking system 170 may be any computer server or combination of servers that are remote from the shipper asset tracking device 130 and carrier asset tracking device 150. The carrier asset tracking system 160 and shipper asset tracking system 170 are configured to receive data from a plurality of asset tracking devices.

Shipper asset tracking device 130 and carrier asset tracking device 150 may communicate through a cellular base station or through an access point. Access points may be any wireless communication access point. For example, a WiFi router or a private router network. Communication may then proceed over a local area network or wide area network such as the Internet and proceed to carrier asset tracking system 160 or shipper asset tracking system 170. In other embodiments, shipper asset tracking device 130 and carrier asset tracking device 150 may communicate through satellite communication or other radio technologies. For example, if the shipper asset tracking device 130 and carrier asset tracking device 150 are travelling to areas that are outside of cellular coverage or access point coverage, satellite communication or other radio technology may be used.

Communication between shipper asset tracking device 130, carrier asset tracking device 150, carrier asset tracking system 160, and shipper asset tracking system 170 may be one directional or bidirectional. Thus, in one embodiment shipper asset tracking device 130 and carrier asset tracking device 150 may provide information to the carrier asset tracking system 160 and the shipper asset tracking system 170 respectively, but the carrier asset tracking system 160 or the shipper asset tracking system 170 does not respond. In other cases, the carrier asset tracking system 160 and the shipper asset tracking system 170 may issue commands to carrier asset tracking device 150 and shipper asset tracking device 130 respectively, but data may be stored internally on shipper asset tracking device 130 and carrier asset tracking device 150 until the shipper asset tracking device 130 and carrier asset tracking device 150 arrive at a particular location. In other cases, two-way communication may exist between carrier asset tracking device 150 and shipper asset tracking device 130 and the carrier asset tracking system 160 and/the shipper asset tracking system 170 respectively.

At some point, the carrier 140 departs the carrier station and exists geofence 110. The shipper asset tracking device 130 reports the location of the cargo 120 to shipper asset tracking system 170. Departing the geofence 110 by the shipper asset tracking device 130 may be considered a trigger event. A trigger event triggers the shipper asset tracking system 170 to determine whether the shipper asset tracking device 130 and cargo 120 are co-located with and being carried by the carrier 140. FIG. 1 depicts a trigger event of exiting the geofence 110. Other trigger events may be used alone or in combination with exiting of the geofence 110 to trigger the shipper asset tracking system 170. Trigger events may include determining the shipper asset tracking device 130 has traveled a certain distance from a landmark, detecting a change of some sensor connected to the shipper asset tracking device 130, for example, a door closing or opening, an update received by the shipper asset tracking system 170 from the carrier asset tracking system 160, location updates from the shipper asset tracking system 170 along a route, a manual switch activated by a carrier 140, and other actions that may be measured to determine whether the shipper asset tracking device 130 and cargo 120 are co-located with and being carried by the carrier 140.

After detecting a triggering event, the shipper asset tracking system 170 may determine that the cargo 120 is co-located with and being carried by the carrier 140 based upon location updates received from either or both of the shipper asset tracking device 130 or the carrier asset tracking system 160. The shipper asset tracking system 170 may then instruct the shipper asset tracking device 130 to enter a low power mode. While the shipper asset tracking device 130 is in low power mode, the shipper asset tracking device 130 may perform one or more of the following: cease communication with the shipper asset tracking system 170; communicate with the shipper asset tracking system 170 less frequently relative to normal operation of the shipper asset tracking device 130; periodically exit low power mode to collect sensor data, for example, location or temperature of goods; and collect data from a subset of the sensors in shipper asset tracking device 130. Data collected while in low power mode may be saved locally at the shipper asset tracking device 130 and uploaded to the shipper asset tracking system 170 when exiting low power mode or when the local device storage is full. Other operations may or may not be performed while in low power mode to increase battery life relative to normal operation of the shipper asset tracking device 130.

While the cargo 120 is co-located with the carrier 140, the shipper asset tracking system 170 may receive location updates from the carrier asset tracking system 160. The carrier asset tracking system 160 may receive location measurements from the carrier asset tracking device 150 while the carrier 140 is in transit from an origin, for example, the carrier station surrounded by geofence 110, to a destination. The destination may be a second carrier station at a different location. The second carrier station may be surrounded by a different geofence (not pictured).

When the shipper asset tracking system 170 instructs the shipper asset tracking device 130 to enter low power mode, the shipper asset tracking system 170 may include a wakeup time for the shipper asset tracking device 130. For example, if the cargo 120 is expected to be in transit for three days, the shipper asset tracking system 170 may instruct the shipper asset tracking device 130 to wake after three days to resume normal tracking and/or additional operations. The shipper asset tracking device 130 may exit low power mode based on other conditions. Any of the previously described trigger events may cause the shipper asset tracking device 130 to exit low power mode. For example, the shipper asset tracking device 130 may take location measurements while in low power, but not transmit them to the shipper asset tracking system 170. Based on the location measurements, the shipper asset tracking device 130 may exit low power mode when it determines that it has arrived at its destination. As another example, a door open event may be detected by the shipper asset tracking device 130. In response to the door open event, the shipper asset tracking device 130 may exit low power mode and transmit a location update and information regarding the door open event.

When the shipper asset tracking device 130 awakes from low power mode, the shipper asset tracking device 130 may take a location measurement and provide the location measurement to shipper asset tracking system 170. Shipper asset tracking system 170 may determine whether the cargo 120 has arrived at the destination. In some cases, the carrier 140 may be delayed. In such cases, the shipper asset tracking system 170 may instruct the shipper asset tracking device 130 to reenter low power mode for a further period of time. In the case where the cargo 120 has arrived at the destination, the shipper asset tracking device 130 may continue in normal power mode.

Figure 2:
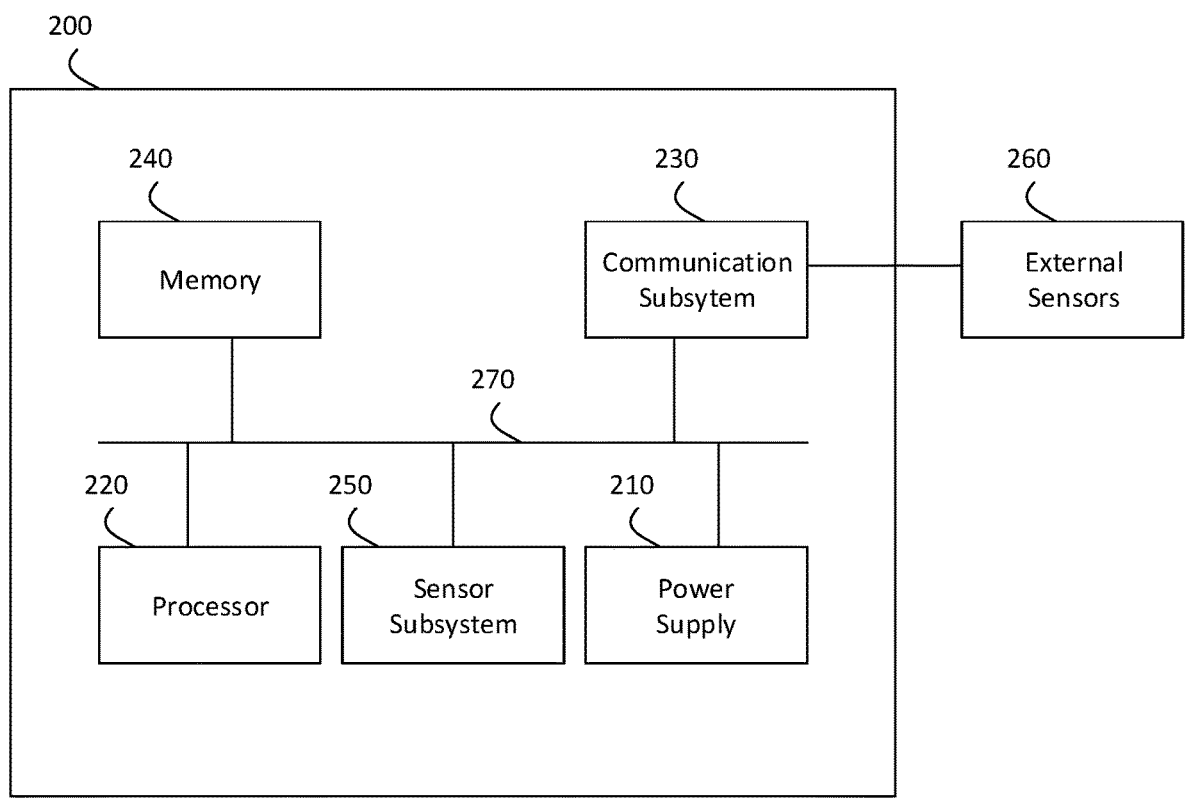
FIG. 2 is a diagram of an embodiment of an asset tracking device.

FIG. 2 is a diagram of an embodiment of a tracking device 200. Shipper asset tracking device 130 and carrier asset tracking device 150 may include features of tracking device 200. Tracking device 200 may include a power supply 210, processor 220, communications subsystem 230, memory 240, and sensor subsystem 250. The components of tracking device 200 may communicate via bus 270. Tracking device 200 may be a standalone device or may be included as part of a larger apparatus, for example, tracking device 200 may be integrated into a vehicle's subsystems. The processor 220 and communications subsystem 230 may cooperate to perform the methods of the embodiments described herein. Communications subsystem 230 may, in some embodiments, comprise multiple subsystems, for example for different radio technologies. Communications subsystem 230 enables tracking device 200 to communicate with other devices or network elements.

Communications subsystem 230 may use one or more of a variety of communication types, including but not limited to cellular, satellite, Bluetooth™ Bluetooth™ Low Energy, Wi-Fi, wireless local area network (WLAN), near field communications (NFC), ZigBee, wired connections such as Ethernet or fiber, among other options. As such, a communications subsystem 230 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communications subsystem 230 will be dependent upon the communication network or communication technology on which the sensor apparatus is intended to operate.

If communications subsystem 230 operates over a cellular connection, a subscriber identity module (SIM) (not pictured) may be provided to allow such communication. A SIM may be a physical card or may be virtual. In some embodiments the SIM may also be referred to as a universal subscriber identity module (USIM), as merely an identity module (IM), or as an embedded Universal Integrated Circuit Card (eUICC), among other options.

Processor 220 generally controls the overall operation of the tracking device 200 and is configured to execute programmable logic, which may be stored, along with data, using memory 240. Memory 240 can be any tangible, non-transitory computer readable storage medium, including but not limited to optical (for example, compact disk (CD), digital video disc (DVD), etc.), magnetic (for example, tape), flash drive, hard drive, or other types of memory.

Alternatively, or in addition to memory 240, tracking device 200 may access data or programmable logic from an external storage medium, for example through communications subsystem 230. In the embodiment of FIG. 2, tracking device 200 may utilize one or a plurality of sensors, which may either be part of tracking device 200 or may be external to and communicate with tracking device 200. Processor 220 may receive input from a sensor subsystem 250. Sensor subsystem 250 may provide information including, but not limited to, information concerning the current location of the tracking device, the temperature inside a shipping container or trailer that the tracking device is connected to, whether the doors on the shipping container or trailer are closed, whether a sudden acceleration or deceleration event has occurred, the tilt angle of the trailer or shipping container, among other data.

Examples of sensors that may be included in sensor subsystem 250 include a positioning sensor, a Radar, a Light Detection and Ranging (LIDAR) sensor, one or more image sensors, an accelerometer, light sensors, gyroscopic sensors, a thermometer, a hygrometer, and other sensors. Other sensors may be any sensor that is capable of reading or obtaining data that may be useful for tracking device 200. However, the described sensors are merely examples, and in other embodiments different sensors or a subset of sensors may be used. For example, in one embodiment of the present disclosure, only a positioning sensor is provided.

The positioning sensor may use a positioning subsystem such as a Global Navigation Satellite System (GNSS) receiver which may be, for example, a GPS receiver (for example, in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia, and South Korea, Russia's GLONASS system, India's proposed Regional Navigational Satellite System (IRNSS), and Japan's proposed QZSS regional system.

Another sort of positioning subsystem may be used as well, for example a radiolocation subsystem that determines its current location using radiolocation techniques. In other words, the location of the device can be determined using triangulation of signals from in-range base towers, such as used for Wireless Enhanced 911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Sensors may also be external to tracking device 200 and communicate with tracking device 200, for example through communications subsystem 230. Such sensors are shown as external sensors 260. External sensors 260 may have similar features and capabilities of the sensor subsystem 250. For example, external sensors 260 may include external location monitoring sensors that communicate with tracking device 200 using Bluetooth™ Low Energy. Other external sensors and communication methods are possible.

Further, the tracking device 200 may, in some embodiments, act as a gateway, and may communicate with other tracking devices (not shown), where the other tracking devices may act as hubs for a subset of the sensors.

Communications between the various elements of tracking device 200 may be through an internal bus 270 in one embodiment. However, other forms of communication are possible.

Tracking device 200 may be affixed to any fixed or portable platform. For example, tracking device 200 may be affixed to shipping containers, truck trailers, truck cabs, or other cargo.

Power supply 210 may be a battery or other rechargeable type power supply. The power supply 210 may be recharged by an external power source. Recharging methods may include connecting to an external power source, as well as other power sources, such as, but not limited to, solar, electromagnetic, acoustic or vibration charging.

Figure 3:
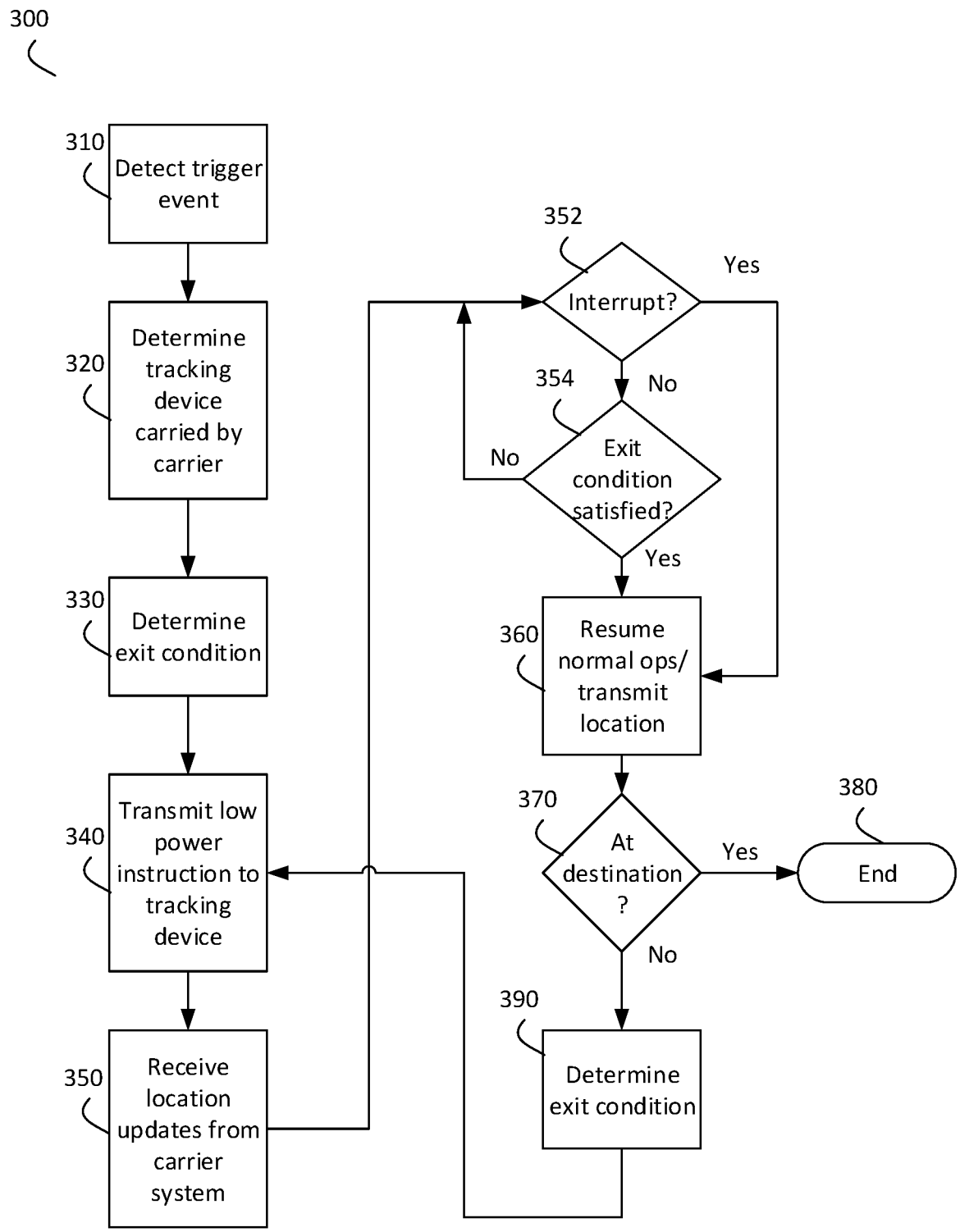
FIG. 3 is a flow diagram of an embodiment of a method for increasing battery life in an asset tracking device.

FIG. 3 is a flow diagram of an embodiment of a method 300 for increased battery life in an asset tracking device. The method 300 begins at step 310 when a trigger event is detected by a shipper asset tracking system, for example, shipper asset tracking system 170. The trigger event may be detected directly by the shipper asset tracking system, or detected via a carrier asset tracking system, a carrier asset tracking device, or a shipper asset tracking device. For example, a trigger event may include a shipper asset tracking device, for example, shipper asset tracking device 130, attached to cargo, for example, cargo 120, leaving a carrier station geofence, for example, geofence 110. The cargo 120 may be on board a carrier, for example, carrier 140. The carrier 140 may have a carrier asset tracking device, for example, carrier asset tracking device 150, for tracking the carrier. A shipper asset tracking system, for example, shipper asset tracking system 170, may receive location measurements from the shipper asset tracking device 130. Other trigger events as described herein may cause the shipper asset tracking system to determine whether the shipper asset tracking device is co-located with the carrier.

At step 320, responsive to receiving the trigger event, the shipper asset tracking system may determine that the shipper asset tracking device is co-located with a carrier. In a first example, in order to determine that the shipper asset tracking device is co-located with the carrier, the shipper asset tracking system may receive or determine a route that the carrier will take to transport the cargo. The route may be transmitted to the shipper asset tracking system from the carrier asset tracking system or may be determined by the shipper asset tracking system based upon an origin and destination of the cargo or determined from publicly available information. Publicly available information may include schedules of the carrier, a known heading that may be followed at the departure times, or information from public carrier tracker systems, for example marine tracking systems or aircraft tracking systems. The shipper asset tracking system may receive location measurements from the shipper asset tracking device after receiving the trigger event. After receiving one or more location measurements that fall along the route that the carrier will take to transport the cargo, the shipper asset tracking system may determine that the shipper asset tracking device is co-located with the carrier. The one or more location measurements may be a predetermined quantity of location measurements equal to five measurements. The predetermined quantity of location measurements may vary based upon various factors including, but not limited to, the reliability of location measurements provided by the shipper asset tracking device or the environment of the carrier's route.

In a second example, in order to determine that the shipper asset tracking device is co-located with the carrier, the shipper asset tracking system may receive location updates of the location of the carrier from the carrier asset tracking system. The shipper asset tracking system may also receive location updates of the cargo from the shipper asset tracking device. Location updates from the carrier system received contemporaneously (e.g., within a few seconds) of the location updates from the carrier asset tracking device may be considered to be corresponding location updates. The shipper asset tracking system may determine the distance between the location of the cargo and the location of the carrier for a given set of corresponding location updates. If the received location of the cargo and the location of the carrier are within a threshold distance for a plurality of corresponding location updates, the shipper asset tracking system may determine the cargo is co-located with the carrier. The plurality of corresponding location updates may be a predetermined quantity of corresponding location updates, for example five corresponding location updates. The plurality of corresponding location updates for the determination may vary based upon various factors including, but not limited to, a confidence level of the location updates, the reliability of location measurements provided by the shipper asset tracking device and carrier asset tracking device or the environment of the carrier's route. Alternatively, the shipper asset tracking system may generate a carrier route using location updates from the carrier asset tracking system and a cargo route using location updates from the shipper asset tracking device. The shipper asset tracking system may determine the cargo is co-located with the carrier if the routes are within a threshold distance of each other. The carrier route and the cargo route may be compared as a whole. Alternatively, one or more points (determined or received location coordinates) along one of the carrier or cargo route may be compared with one or more estimated points which are interpolated between two points (determined or received location coordinates) on the other of the carrier or cargo route. The threshold distance may be based upon the size (given/known or average based on type) of the carrier. For example, a train (the carrier) carrying a container with the cargo may be a mile long. The carrier asset tracking device may be located at the engine at one end of the train and the shipper asset tracking device may be in a container up to a mile away from the carrier asset tracking device. If the corresponding location updates are within one mile of each for five corresponding location updates, the shipper asset tracking system may determine the cargo is co-located with the carrier.

At step 330, the shipper asset tracking system may determine an exit condition for the shipper asset tracking device to exit low power mode. In an embodiment, the shipper asset tracking system may determine an estimated time of arrival (ETA) of the carrier at its destination. The shipper asset tracking system may receive the ETA from a carrier system, or may calculate the ETA based on the route of the carrier from an origin (inside the geofence) to the destination, or may determine the ETA from publicly available information. The shipper asset tracking system may determine a low power duration for the shipper asset tracking device based on the ETA. For example, if the ETA is three days, the shipper asset tracking system may set the low power duration to three days. Other exit conditions may be determined, for example, the shipper asset tracking device may periodically determine its location without transmitting a location update in order to conserve battery life. The exit condition in this case may occur when the shipper asset tracking device determines that it is at or near the destination location.

At step 340, the shipper asset tracking system sends a message to the shipper asset tracking device including an instruction for the shipper asset tracking device to enter low power mode. The message may also include the exit condition, for example, a low power duration to indicate how long the shipper asset tracking device should remain in low power mode. In response to the message from the shipper asset tracking system, the shipper asset tracking device may enter low power mode.

Optionally, at step 350, the carrier asset tracking system may provide location updates of the cargo obtained from the carrier asset tracking device or otherwise to the shipper asset tracking system. The location updates may be pushed from the carrier asset tracking system to the shipper asset tracking system, pulled from the carrier asset tracking system by the shipper asset tracking system, or transmitted on demand by either the shipper asset tracking system or the carrier asset tracking system.

While the shipper asset tracking device is in low power mode, the shipper asset tracking device may monitor for an interrupt of the low power mode at step 352. An interrupt of the low power mode may include, for example, opening of a door of a shipping container, or some other action that may indicate the cargo has arrived at its destination. The interrupt of low power mode may be triggered by the cargo arriving at its destination early, thus the low power duration may need to be interrupted in order for the shipper asset tracking device to return to normal operations.

At step 354, the shipper asset tracking device may detect whether the low power duration has expired. Upon expiration of the low power duration, at step 360, the shipper asset tracking device resumes normal operations. Upon returning to normal operations, the shipper asset tracking device 130 transmits a location measurement to the shipper asset tracking system. The shipper asset tracking system may determine if the shipper asset tracking device is at its destination at step 370 based upon the received location measurements. If the shipper asset tracking device is not at the destination, the shipper asset tracking system may determine an exit condition at step 390. For example, the shipper asset tracking system may determine an updated low power duration based upon a new ETA calculated based on the current location of the shipper asset tracking device. The method may then return to step 340 where the shipper asset tracking system may transmit the updated exit condition to the shipper asset tracking device. If the shipper asset tracking device is at the destination at step 370, the method may end at step 380.

Figure 4:
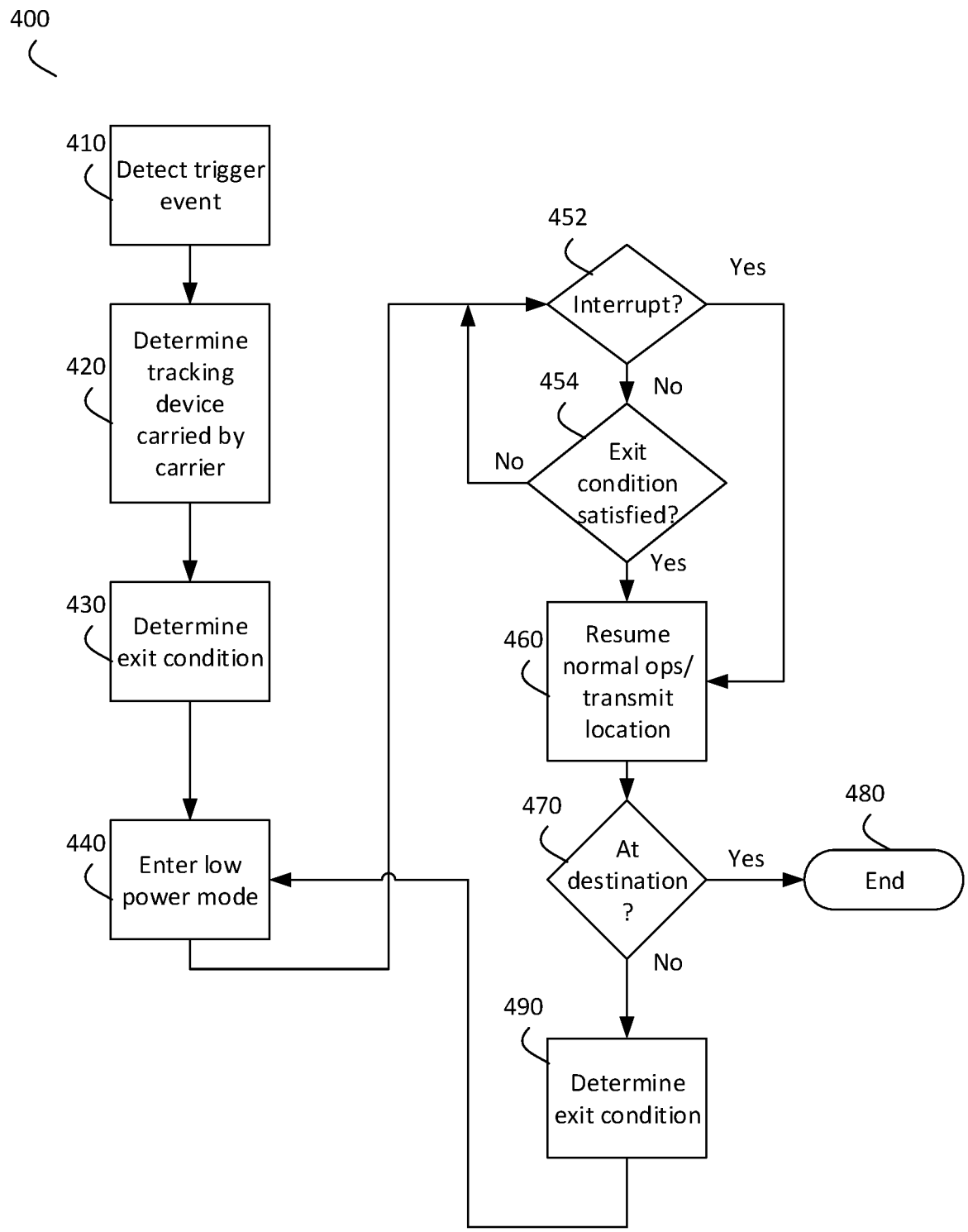
FIG. 4 is a flow diagram of an embodiment of a method for increasing battery life in an asset tracking device.

FIG. 4 is a flow diagram of an embodiment of a method 400 for increased battery life in an asset tracking device. The method 400 begins at step 410 when a trigger event is detected by a shipper asset tracking device, for example, shipper asset tracking device 130. The trigger event may be detected directly by the shipper asset tracking device, or detected via a carrier asset tracking system, a carrier asset tracking device, or a shipper asset tracking system. For example, a trigger event may include the shipper asset tracking device leaving a carrier station geofence, for example, geofence 110. Other trigger events as described herein may cause the shipper asset tracking device to determine whether it is co-located with the carrier.

At step 420, responsive to detecting the trigger event, the shipper asset tracking device may determine that it is co-located with a carrier. In a first example, in order to determine that the shipper asset tracking device is co-located with the carrier, the shipper asset tracking system may receive or determine a route that the carrier will take to transport the cargo. The route may be transmitted to the shipper asset tracking device from the carrier asset tracking system, the shipper asset tracking system, or may be determined by the shipper asset tracking device based upon an origin and destination of the cargo or determined from publicly available information. Publicly available information may include schedules of the carrier, a known heading that may be followed at the departure times of carriers, or information from public carrier tracker systems, for example marine tracking systems or aircraft tracking systems. The shipper asset tracking device may periodically determine location measurements. After determining one or more location measurements that are within a threshold distance of the route that the carrier will take to transport the cargo, the shipper asset tracking device may determine that the shipper asset tracking device is co-located with the carrier. The one or more location measurements may be a predetermined quantity of location measurements equal to five measurements. The predetermined quantity of location measurements may vary based upon various factors including, but not limited to, the reliability of location measurements provided by the shipper asset tracking device or the environment of the carrier's route.

Alternatively, the shipper asset tracking device may generate a carrier route using location updates from the carrier asset tracking system and a cargo route using location updates from the shipper asset tracking device. The shipper asset tracking device may determine the cargo is co-located with the carrier if the routes are within a threshold distance of each other. The carrier route and the cargo route may be compared as a whole. Alternatively, one or more points (determined or received location coordinates) along one of the carrier or cargo route may be compared with one or more estimated points which are interpolated between two points (determined or received location coordinates) on the other of the carrier or cargo route. The threshold distance may be based upon the size (given/known or average based on type) of the carrier. For example, a train (the carrier) carrying a container with the cargo may be a mile long. The carrier asset tracking device may be located at the engine at one end of the train and the shipper asset tracking device may be in a container up to a mile away from the carrier asset tracking device. If the corresponding location updates are within one mile of each for five corresponding location updates, the shipper asset tracking system may determine the cargo is co-located with the carrier.

At step 430, the shipper asset tracking device may determine an exit condition for the shipper asset tracking device to exit low power mode. In an embodiment, the shipper asset tracking device may determine an estimated time of arrival (ETA) of the carrier at its destination. The shipper asset tracking device may receive the ETA from a carrier system, or may calculate the ETA based on the route of the carrier from an origin (inside the geofence) to the destination, or may determine the ETA from publicly available information. The shipper asset tracking device may determine a low power duration for the shipper asset tracking device based on the ETA. For example, if the ETA is three days, the shipper asset tracking device may set the low power duration to three days. Other exit conditions may be determined, for example, the shipper asset tracking device may periodically determine its location without transmitting a location update in order to conserve battery life. The exit condition in this case may occur when the shipper asset tracking device determines that it is at or near the destination location.

At step 440, the shipper asset tracking device enters low power mode. While the shipper asset tracking device is in low power mode, the shipper asset tracking device may monitor for an interrupt of the low power mode at step 452. An interrupt of the low power mode may include, for example, opening of a door of a shipping container, or some other action that may indicate the cargo has arrived at its destination. The interrupt of low power mode may be triggered by the cargo arriving at its destination early, thus the low power duration may need to be interrupted in order for the shipper asset tracking device to return to normal operations.

At step 454, the shipper asset tracking device may detect whether the low power duration has expired. Upon expiration of the low power duration, at step 460, the shipper asset tracking device resumes normal operations. Upon returning to normal operations, the shipper asset tracking device transmits a location measurement to the shipper asset tracking system. The shipper asset tracking device or the shipper asset tracking system may determine if the shipper asset tracking device is at its destination at step 470 based upon the received location measurements. If the shipper asset tracking device is not at the destination, the shipper asset tracking device may determine an exit condition at step 490. For example, the shipper asset tracking device may determine an updated low power duration based upon a new ETA calculated based on the current location of the shipper asset tracking device. The method may then return to step 440 where the shipper asset tracking device enters low power mode. If the shipper asset tracking device is at the destination at step 470, the method may end at step 480.

A carrier asset tracking system or shipper asset tracking system may be any type of computer, server, or network node. For example, a server that may perform the embodiments described above is provided with regards to FIG. 5.

Figure 5:
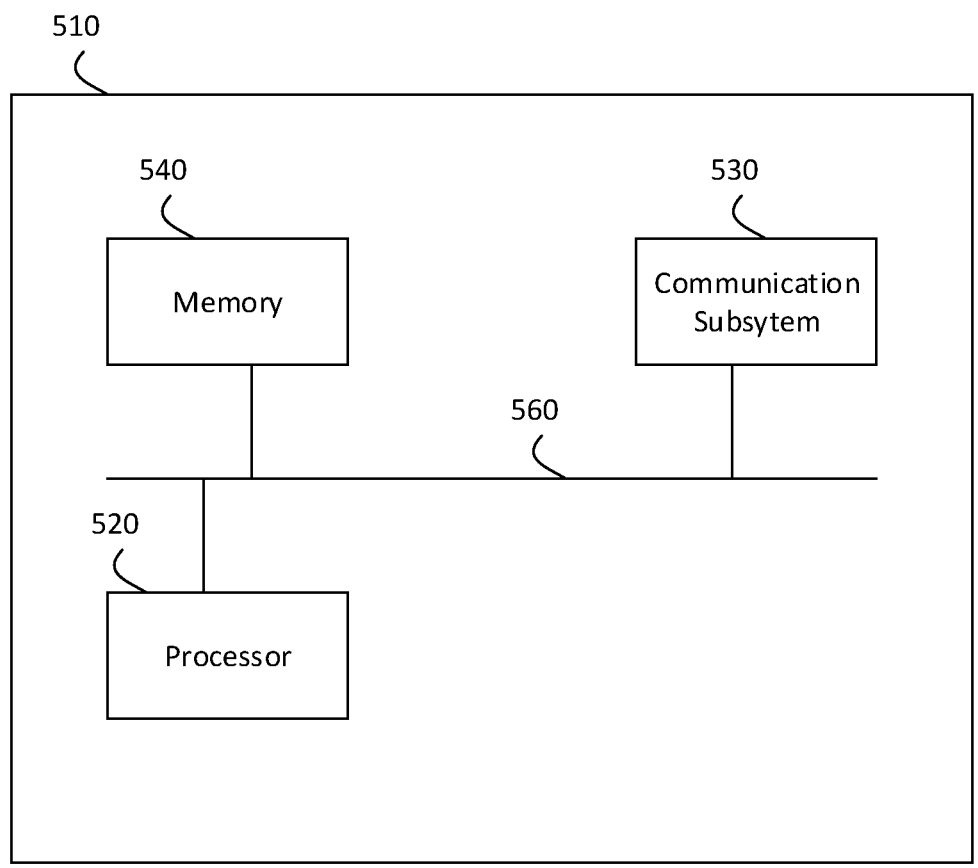
FIG. 5 is a diagram of an embodiment of a server for increasing battery life in a asset tracking device.

In FIG. 5, server 510 includes a processor 520 and a communications subsystem 530, where the processor 520 and communications subsystem 530 cooperate to perform the methods of the embodiments described herein.

The processor 520 is configured to execute programmable logic, which may be stored, along with data, on the server 510, and is shown in the example of FIG. 5 as memory 540. The memory 540 can be any tangible, non-transitory computer readable storage medium, such as optical (for example, CD, DVD, etc.), magnetic (for example, tape), flash drive, hard drive, or other types of memory. In one embodiment, processor 520 may also be implemented entirely in hardware and not require any stored program to execute logic functions. Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a CD or a DVD; or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution. Alternatively, or in addition to the memory 540, the server 510 may access data or programmable logic from an external storage medium, for example through the communications subsystem 530.

The communications subsystem 530 allows the server 510 to communicate with other devices or network elements. Communications subsystem 530 may include multiple subsystems, for example for different radio technologies. Communications subsystem 530 enables server 510 to communicate with other devices or network elements.

Communications subsystem 530 may use one or more of a variety of communication types, including but not limited to cellular, satellite, Bluetooth™ Bluetooth™ Low Energy, Wi-Fi, wireless local area network (WLAN), NFC, ZigBee, wired connections such as Ethernet or fiber, among other options. As such, a communications subsystem 530 for wireless communications will typically have one or more receivers and transmitters, as well as associated components such as one or more antenna elements, LOs, and may include a processing module such as a DSP. As will be apparent to those skilled in the field of communications, the particular design of the communications subsystem 530 will be dependent upon the communication network or communication technology on which the sensor apparatus is intended to operate.

If communications subsystem 530 operates over a cellular connection, a SIM (not pictured) may be provided to allow such communication. A SIM may be a physical card or may be virtual. In some embodiments the SIM may also be referred to as a universal subscriber identity module (USIM), as merely an IM, or as an embedded eUICC, among other options.

Communications between the various elements of the server 510 may be through an internal bus 560 in one embodiment. However, other forms of communication are possible.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

In particular, the present disclosure may include the embodiments of the following clauses.

AA. A method for asset tracking using an asset tracking device, the method comprising detecting a trigger to perform a co-location check; in response to the trigger, determining the asset tracking device is co-located with a carrier en route to a destination; determining a low power duration; and causing the asset tracking device to enter a low power mode for the low power duration.

BB. The method of clause AA, further comprising receiving a location update from the asset tracking device; determining whether the asset tracking device is at the destination; and determining an updated low power duration when the asset tracking device is not at the destination.

CC. The method of clause AA or clause BB, further comprising receiving location updates from a carrier asset tracking system associated with the carrier during the low power duration.

DD. The method of any one of clauses AA to CC, wherein determining the low power duration comprises receiving an estimated time of arrival at the destination from a carrier asset tracking system; and determining the low power duration based upon the estimated time of arrival.

EE. The method of any one of clauses AA to CC, wherein determining the low power duration comprises determining an estimated time of arrival at the destination based upon one or more of a distance from an origin of the carrier to the destination, or publicly available information about the carrier; and determining the low power duration based upon the estimated time of arrival.

FF. The method of any one of clauses AA to EE, wherein determining the asset tracking device is co-located with the carrier comprises determining a route of the carrier from an origin of the carrier to the destination; receiving a plurality of location updates from the asset tracking device; determining whether the plurality of location updates are within a threshold distance of the route; and determining the asset tracking device is co-located with the carrier when one or more of the plurality of location updates are within the threshold distance of the route.

GG. The method of any one of clauses AA to EE, wherein determining the asset tracking device is co-located with the carrier comprises receiving a first plurality of location updates from a carrier asset tracking system; receiving a second plurality of location updates from the asset tracking device; determining the tracking device is co-located with the carrier when one or more of the first plurality of location updates are within a threshold distance of one or more of the second plurality of location updates.

HH. An asset tracking system comprising a memory; and a processor coupled to the memory, the processor configured to detect a trigger to perform a co-location check; in response to the trigger, determine an asset tracking device is co-located with a carrier en route to a destination; determine a low power duration; and cause the asset tracking device to enter a low power mode for the low power duration.

IL The asset tracking system of clause II, wherein the processor is further configured to: receive a location update from the asset tracking device; determine whether the asset tracking device is at the destination; and determine an updated low power duration when the asset tracking device is not at the destination.

JJ. The asset tracking system of clause HH or clause II, wherein the processor is further configured to receive location updates from a carrier asset tracking system associated with the carrier during the low power duration.

KK. The asset tracking system of any of clauses HH to JJ, wherein the processor configured to determine the low power duration comprises the processor configured to receive an estimated time of arrival at the destination from a carrier asset tracking system; and determine the low power duration based upon the estimated time of arrival.

LL. The asset tracking system of any of clauses HH to JJ, wherein the processor configured to determine the low power duration comprises the processor configured to determine an estimated time of arrival at the destination based upon one or more of a distance from an origin of the carrier to the destination, or publicly available information about the carrier; and determine the low power duration based upon the estimated time of arrival.

MM. The asset tracking system of any of clauses HH to LL, wherein the processor configured to determine the tracking device is co-located with the carrier comprises the processor configured to determine a route of the carrier from an origin of the carrier to the destination; receive a plurality of location updates from the asset tracking device; determine whether the plurality of location updates are within a threshold distance of the route; and determine the asset tracking device is co-located with the carrier when one or more of the plurality of location updates are within the threshold distance of the route.

NN. The asset tracking system of any of clauses HH to LL, wherein the processor configured to determine the tracking device is co-located with the carrier comprises the processor configured to receive a first plurality of location updates from a carrier asset tracking system; receive a second plurality of location updates from the asset tracking device; determine the tracking device is co-located with the carrier when one or more of the first plurality of location updates are within a threshold distance of one or more of the second plurality of location updates.

OO. A method for asset tracking using an asset tracking device, the method comprising transmitting a plurality of location updates to an asset tracking system; receiving a message from the asset tracking system, the message comprising a low power instruction and a low power duration; entering a low power mode in response to the low power instruction; and exiting the low power mode in response to either expiration of the low power duration or detection of an interrupt.

PP. The method of clause OO, further comprising transmitting an additional location update in response to exiting the low power mode; receiving another message comprising the low power instruction and an updated low power duration; and entering the low power mode in response to the low power instruction.

QQ. The method of clause OO or clause PP, wherein the interrupt comprises a condition detected when the asset tracking device arrives at a destination prior to expiration of the low power duration.

RR. The method of clause QQ, wherein the condition comprises opening of a door of a container where the asset tracking device is installed.

SS. An asset tracking device comprising a memory; and a processor coupled to the memory, the processor configured to transmit a plurality of location updates to an asset tracking system; receive a message from the asset tracking system, the message comprising a low power instruction and a low power duration; enter a low power mode in response to the low power instruction; and exit the low power mode in response to either expiration of the low power duration or detection of an interrupt.

TT. The asset tracking device of clause SS, wherein the processor is further configured to transmit an additional location update in response to exiting the low power mode; receive another message comprising the low power instruction and an updated low power duration; and enter the low power mode in response to the low power instruction.

UU. The asset tracking device of clause SS or clause TT wherein the interrupt comprises a condition detected when the asset tracking device arrives at a destination prior to expiration of the low power duration.

VV. The asset tracking device of clause UU, wherein the condition comprises opening of a door of a container where the asset tracking device is installed.

What is claimed is:

1. A method for asset tracking using an asset tracking device, the method comprising:
   detecting a trigger to perform a co-location check;
   in response to the trigger, determining the asset tracking device is co-located with a carrier en route to a destination by:
      determining a route of the carrier from an origin of the carrier to the destination;
      receiving a plurality of location updates from the asset tracking device;
      determining whether the plurality of location updates are within a threshold distance of the route; and
      determining the asset tracking device is co-located with the carrier when one or more of the plurality of location updates are within the threshold distance of the route;
   determining a low power duration; and
   causing the asset tracking device to enter a low power mode for the low power duration.

2. The method of claim 1, further comprising:
   receiving a location update from the asset tracking device;
   determining whether the asset tracking device is at the destination; and
   determining an updated low power duration when the asset tracking device is not at the destination.

3. The method of claim 1, further comprising receiving location updates from a carrier asset tracking system associated with the carrier during the low power duration.

4. The method of claim 1, wherein determining the low power duration comprises:
   receiving an estimated time of arrival at the destination from a carrier asset tracking system; and
   determining the low power duration based upon the estimated time of arrival.

5. The method of claim 1, wherein determining the low power duration comprises:
   determining an estimated time of arrival at the destination based upon one or more of a distance from an origin of the carrier to the destination, or publicly available information about the carrier; and
   determining the low power duration based upon the estimated time of arrival.

6. An asset tracking system comprising:
   a memory; and
   a processor coupled to the memory, the processor configured to:
      detect a trigger to perform a co-location check;
      in response to the trigger, determine an asset tracking device is co-located with a carrier en route to a destination by:
         receive a first plurality of location updates from a carrier asset tracking system;
         receive a second plurality of location updates from the asset tracking device; and
         determine the tracking device is co-located with the carrier when one or more of the first plurality of location updates are within a threshold distance of one or more of the second plurality of location updates;
determine a low power duration; and
cause the asset tracking device to enter a low power mode for the low power duration.

7. The asset tracking system of claim 6, wherein the processor is further configured to:
receive a location update from the asset tracking device;
determine whether the asset tracking device is at the destination; and
determine an updated low power duration when the asset tracking device is not at the destination.

8. The asset tracking system of claim 6, wherein the processor is further configured to receive location updates from a carrier asset tracking system associated with the carrier during the low power duration.

9. The asset tracking system of claim 6, wherein the processor configured to determine the low power duration comprises the processor configured to:
receive an estimated time of arrival at the destination from a carrier asset tracking system; and
determine the low power duration based upon the estimated time of arrival.

10. The asset tracking system of claim 6, wherein the processor configured to determine the low power duration comprises the processor configured to:
determine an estimated time of arrival at the destination based upon one or more of a distance from an origin of the carrier to the destination, or publicly available information about the carrier; and
determine the low power duration based upon the estimated time of arrival.

11. A method for asset tracking using an asset tracking device, the method comprising:
transmitting a plurality of location updates to an asset tracking system;
receiving a message from the asset tracking system, the message comprising a low power instruction and a low power duration;
entering a low power mode in response to the low power instruction; and
exiting the low power mode in response to either expiration of the low power duration or detection of an interrupt, wherein the interrupt comprises a condition detected when the asset tracking device arrives at a destination prior to expiration of the low power duration.

12. The method of claim 11, further comprising:
transmitting an additional location update in response to exiting the low power mode;
receiving another message comprising the low power instruction and an updated low power duration; and
entering the low power mode in response to the low power instruction.

13. An asset tracking device comprising:
a memory; and
a processor coupled to the memory, the processor configured to:
transmit a plurality of location updates to an asset tracking system;
receive a message from the asset tracking system, the message comprising a low power instruction and a low power duration;
enter a low power mode in response to the low power instruction; and
exit the low power mode in response to either expiration of the low power duration or detection of an interrupt, wherein the condition comprises opening of a door of a container where the asset tracking device is installed.

14. The asset tracking device of claim 13, wherein the processor is further configured to:
transmit an additional location update in response to exiting the low power mode;
receive another message comprising the low power instruction and an updated low power duration; and
enter the low power mode in response to the low power instruction.

* * * * *